(12) United States Patent
Robert et al.

(10) Patent No.: US 7,946,653 B2
(45) Date of Patent: May 24, 2011

(54) VEHICLE SEAT BACK COMPRISING A RETRACTABLE HEADREST

(75) Inventors: Jacques Robert, Marcoussis (FR); Laurent Morinet, Neuilly Plaisance (FR)

(73) Assignee: Faurecia Sieges d'Automobile, Nanterre (FR)

( * ) Notice: Subject to any disclaimer, the term of this patent is extended or adjusted under 35 U.S.C. 154(b) by 123 days.

(21) Appl. No.: 12/400,462

(22) Filed: Mar. 9, 2009

(65) Prior Publication Data

US 2010/0060067 A1 Mar. 11, 2010

(30) Foreign Application Priority Data

Mar. 12, 2008 (FR) ...................................... 08 51623

(51) Int. Cl.
*A47C 1/10* (2006.01)
(52) U.S. Cl. ........................................ 297/410; 297/408
(58) Field of Classification Search .................. 297/410, 297/408, 391
See application file for complete search history.

(56) References Cited

U.S. PATENT DOCUMENTS

| | | | |
|---|---|---|---|
| 6,607,242 B2 * | 8/2003 | Estrada et al. | 297/216.12 |
| 7,140,687 B2 * | 11/2006 | Hoekstra et al. | 297/410 |
| 2010/0171354 A1 * | 7/2010 | Homan et al. | 297/410 |
| 2010/0213748 A1 * | 8/2010 | Iniguez et al. | 297/410 |

FOREIGN PATENT DOCUMENTS

| | | |
|---|---|---|
| BE | 1 016 944 | 10/2007 |
| DE | 196 44 016 | 5/1998 |
| DE | 20 2004 021396 | 12/2007 |
| FR | 2 771 686 | 6/1999 |

OTHER PUBLICATIONS

French Search Report and Written Opinion from French priority application No. FR 08 51623; Report dated Oct. 24, 2008.

* cited by examiner

*Primary Examiner* — Milton Nelson, Jr.
(74) *Attorney, Agent, or Firm* — Miller, Matthias & Hull, LLP

(57) ABSTRACT

Motor vehicle seat back comprising a structure, a headrest, a headrest, a support, a slide, a return element and a lock. The structure comprises at least one socket. The headrest comprises at least one stem mounted so as to slide in the socket between a high position and a low position. The stem has a curve. The support is mounted on the structure through an articulation element having at least a degree of freedom to rotate about an axis of orientation. The slide is connected to the stem and capable of sliding relative to the support in a direction of sliding. The return element is interposed between the slide and the support and biases the headrest towards its low position. The lock has an active state in which it is capable of holding the headrest in the high position and an inactive position in which it releases the headrest.

10 Claims, 6 Drawing Sheets

VEHICLE SEAT BACK COMPRISING A RETRACTABLE HEADREST

CROSS-REFERENCE TO RELATED APPLICATIONS

This application claims priority under the Paris Convention to French Patent Application No. 08 51623, filed on Mar. 12, 2008.

FIELD OF THE DISCLOSURE

The invention relates to a motor vehicle seat back, more particularly designed to be placed at the rear of the vehicle.

BACKGROUND OF THE DISCLOSURE

Already known from document FR 2 771 686 is a back comprising:
- a structure comprising at least one socket,
- a headrest comprising at least one stem mounted so as to slide in said socket between a high position and a low position,
- a support connected to the structure,
- a slide linked to the stem and capable of sliding relative to the support in a direction of sliding,
- a return element interposed between the slide and the support and biasing the headrest to its low position,
- a lock having an active state in which it is capable of holding the headrest in the high position and an inactive position in which it releases the headrest.

Therefore, the headrest may be easily retracted by bringing it to a low position by acting on the lock, in order to prevent it hampering the rear vision of the driver.

SUMMARY OF THE DISCLOSURE

The object of the invention is to enhance the protection provided by the headrest and to enhance its retraction.

According to the invention, the stem has a curve and the support is mounted on the structure through an articulation element having at least a degree of freedom to rotate about an axis of orientation.

Therefore, the headrest may be height-adjusted while remaining close to the head of the occupant and may be easily retracted. Such a solution is simple and makes it possible to easily dispense with problems associated with dispersion in the positioning of the stems relative to the structure of the seat.

To make the production of the back still easier and to improve the retraction of the headrest, according to the invention the articulation element is preferably a swivel (ball and socket joint) allowing three degrees of freedom to rotate between the support and the structure.

Preferably, according to the invention, the headrest comprises two stems to which the slide is connected. Therefore, the headrest is more effectively guided relative to the structure.

According to another feature according to the invention, the lock preferably acts between the slide and the support.

This solution is simple, effective and robust.

Preferably, the axis of rotation extends substantially horizontally and laterally relative to the back.

According to yet another feature according to the invention, the back preferably also comprises a strap having a first end placed on the upper portion of the back and a second end connected to the lock.

Thus, the lock may be easily placed in its inactive state by pulling on the strap.

According to another feature according to the invention, the stem preferably comprises a succession of bearing zones separated from one another by intermediate zones having a cross section that is smaller than the cross section of the bearing zones.

Thus, the friction of the stem in the socket is reduced.

According to an additional feature, the bearing zones are separated from one another preferably by a length of between 60% and 90% of the length of the socket.

This effectively reduces the friction of the stem in the socket without compromising the guidance of the stem in the socket.

According to another feature, the bearing zones preferably have a length of between 3% and 20% of the length of the socket.

This feature also contributes to a good compromise between friction and guidance between the stem and the socket.

BRIEF DESCRIPTION OF THE DRAWINGS

Other features and advantages of the present invention will appear in the following detailed description, with reference to the appended drawings in which.

DETAILED DESCRIPTION

Figure 1:
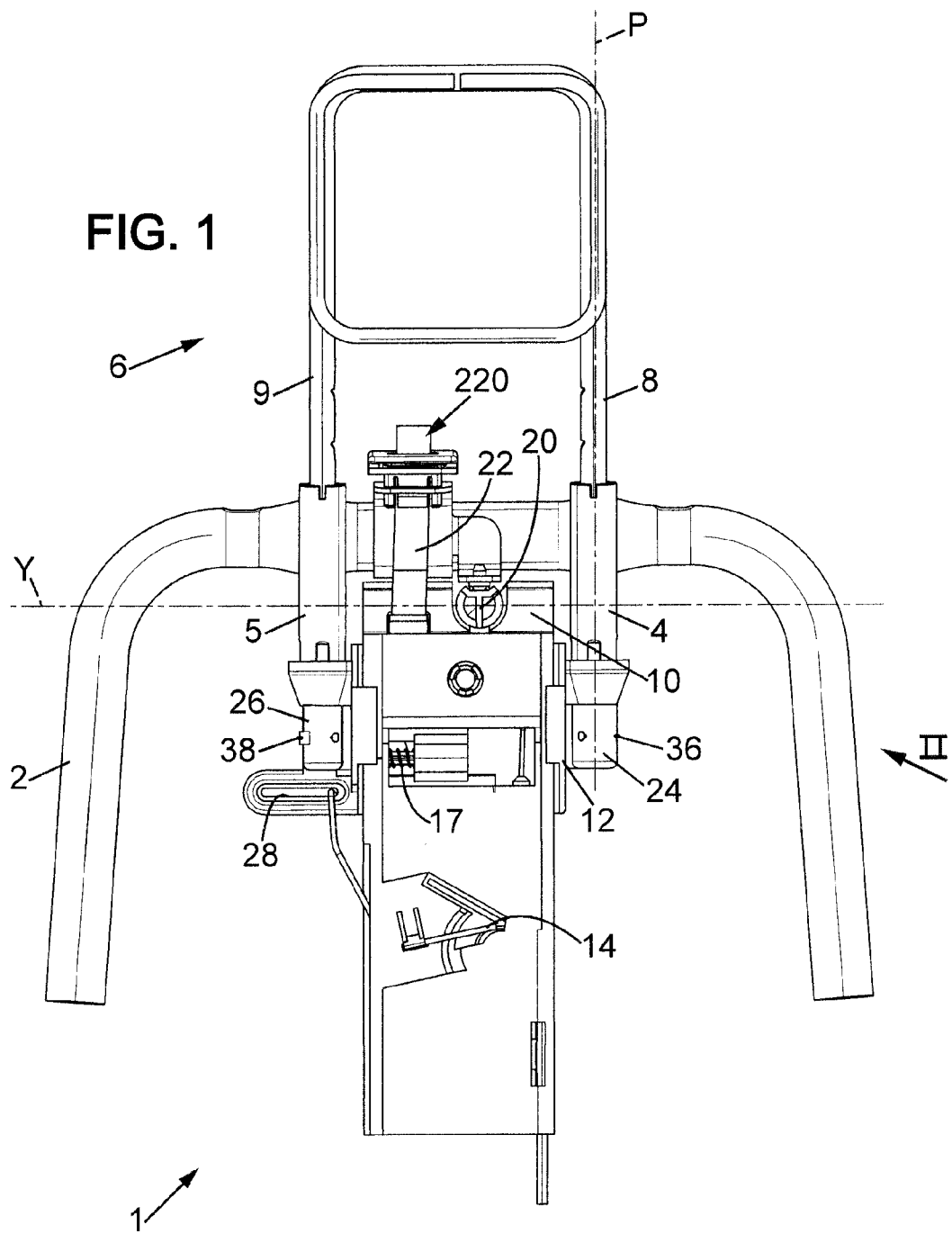
FIG. 1 illustrates a seat according to the invention in front view, the headrest being in the high position.

FIGS. 1 to 5 illustrate a motor vehicle seat back 1. This back essentially comprises a structure 2, a headrest 6 and a retraction assembly comprising essentially a support 10, a slide 12, a return spring 14 and a lock 16.

The structure 2 has substantially the shape of a tubular frame to which two sockets 4, 5 are attached each having a passageway extending substantially in a substantially vertical direction of elevation Z. The back 1 also has a lateral direction Y, perpendicular to the direction of elevation Z and a longitudinal direction X substantially perpendicular to the lateral direction Y and to the direction of elevation Z.

The headrest 6 comprises two stems 8, 9 secured to one another and extending through the passageway of the sockets respectively 4, 5. The stems 8, 9 have a first end 8a, 9a that is free and a second end 8b, 9b by which they are connected together. Each of the stems 8, 9 has a substantially constant curve. The stem 8 extends in a curvilinear direction Z″ extending in a plane P that is substantially perpendicular to the lateral direction Y of the back 1.

The plane of curvature P is substantially perpendicular to the lateral direction Y.

The support 10 is connected to the structure 2 by an articulation element 20 formed of a swivel (ball and socket joint) allowing the support 10 to be oriented relative to the structure 2 in rotation about the direction of elevation Z, the lateral direction Y and the longitudinal direction X.

The slide 12 is capable of moving in translation relative to the support 10 in a direction of sliding Z' substantially parallel to the direction of elevation Z. The slide 12 comprises two cups 24, 26 each having a flared, substantially conical opening, and a substantially cylindrical portion in which the free end 8a, 9a of the stems 8, 9 is placed. The ends 8a, 9a of the stems 8, 9 are secured to the cups respectively 24, 26 by pins 36, 38.

The return spring 14 is in this instance of the coil type and has a first end 14a in contact with the support 10 and a second end 14b held in a groove 28 of the slide 12. The return spring 14 tends to move the slide 12 downwards in the direction of sliding Z' and consequently to move the headrest from the high position shown in FIGS. 1 to 4 to the low position shown in FIG. 5.

Figure 2:
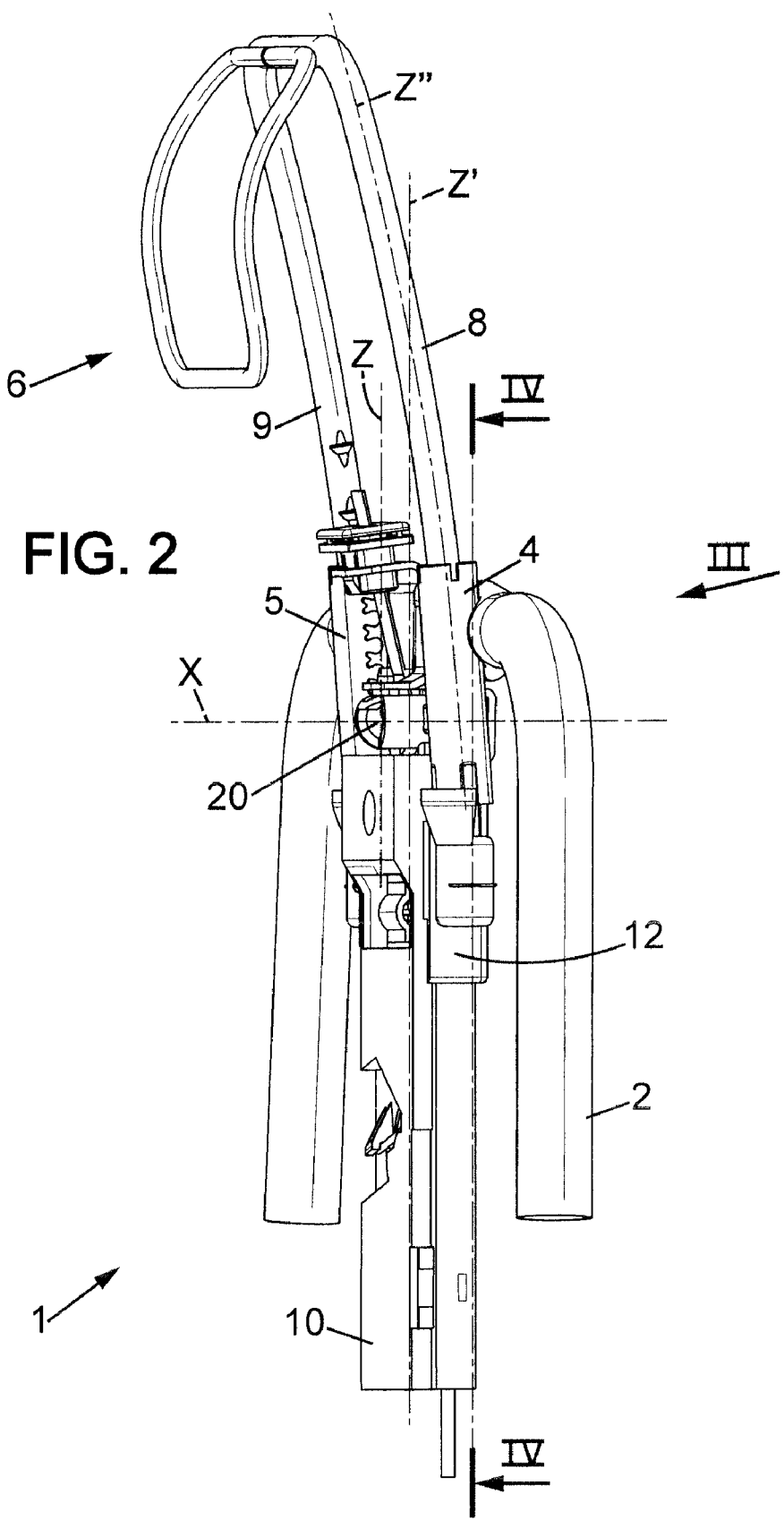
FIG. 2 represents the back in perspective from the side in the direction of the arrow referenced II in FIG. 1.
Figure 3:
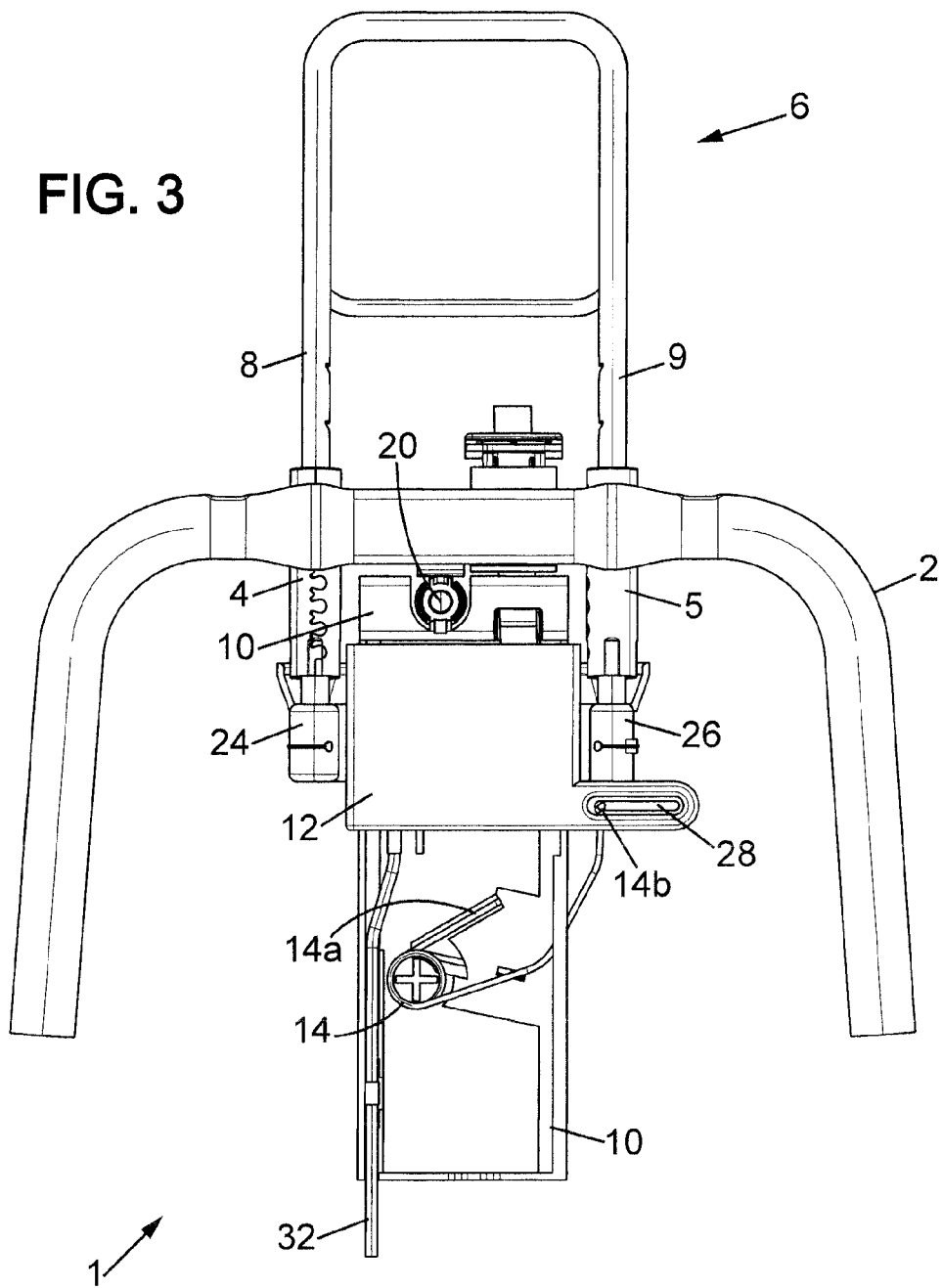
FIG. 3 represents the back seen from behind, in the direction of the arrow referenced III in FIG. 2.
Figure 4:
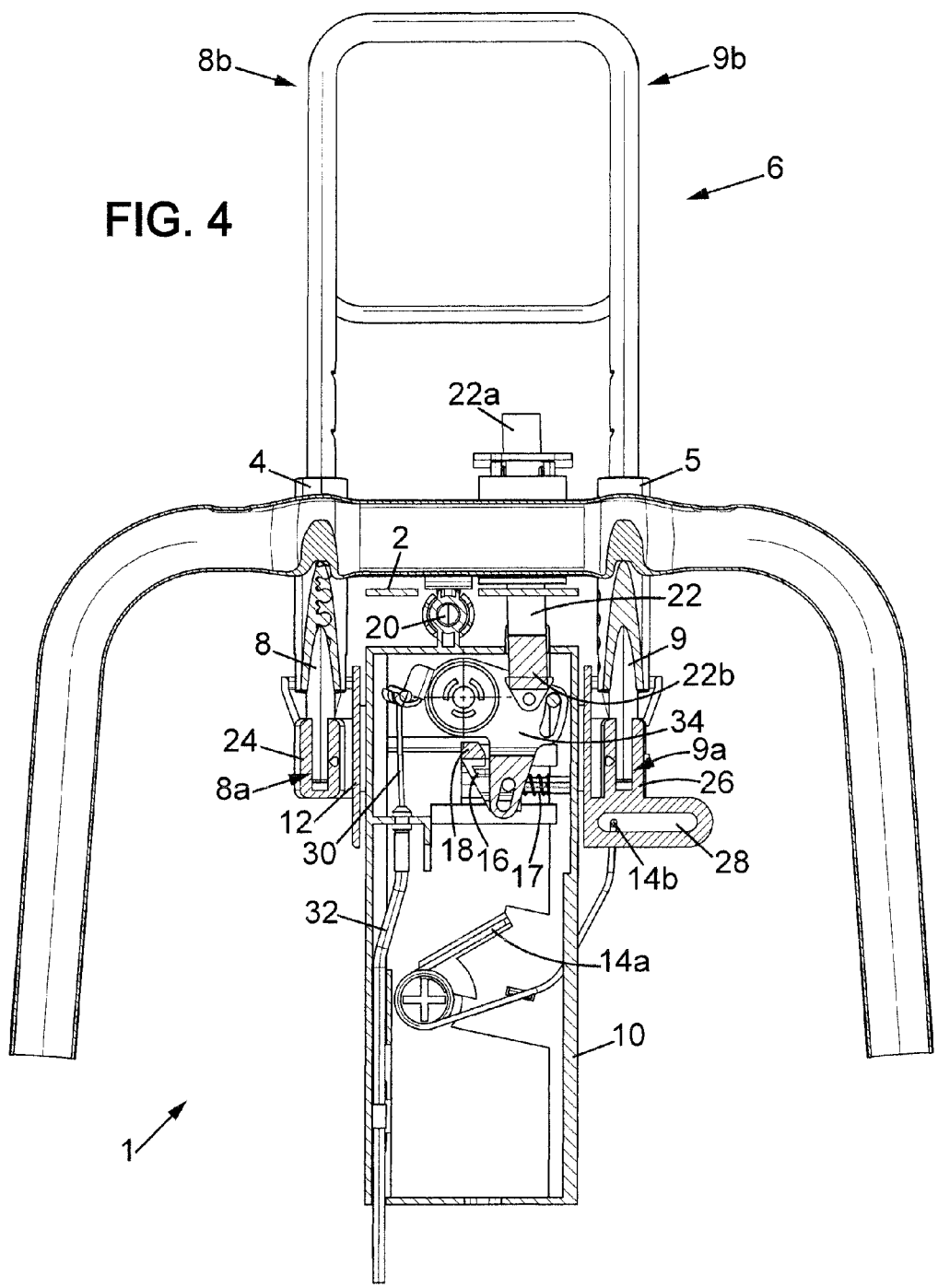
FIG. 4 represents the back in section on the plane referenced IV-IV in FIG. 2.
Figure 5:
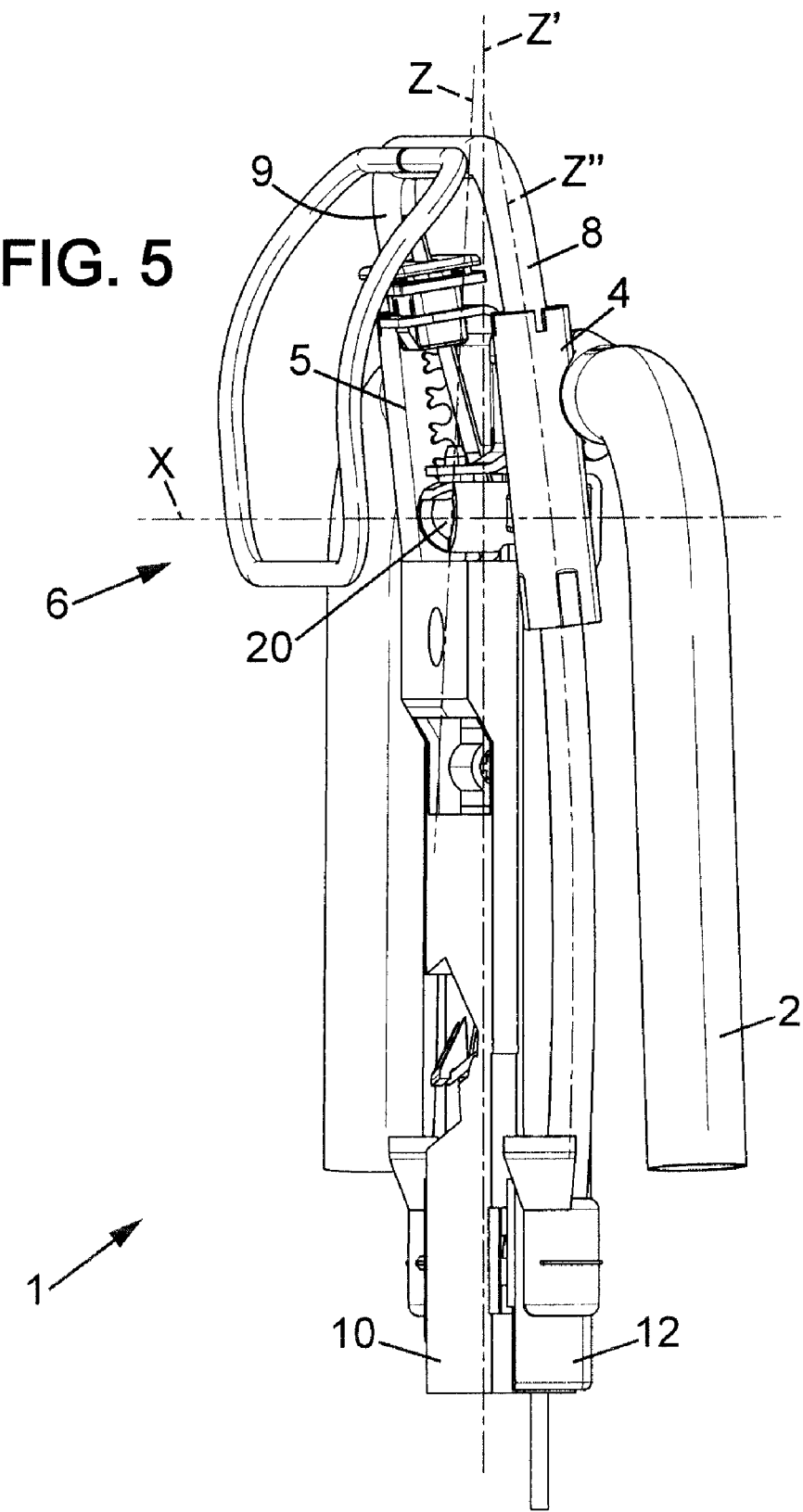
FIG. 5 represents the back, according to FIG. 2, the headrest being in the low position.

It will be noted by comparing FIGS. 2 and 5 that, when the headrest passes from its high position to its low position, because of the curve of the stems 8, 9, the support 10 pivots in particular about an axis of orientation extending in the lateral direction Y so that the direction of sliding Z' inclines by a few degrees (approximately 5 degrees) relative to the direction of elevation Z.

The lock 16 comprises a bolt that can be moved between an active position in which it holds the slide 12 in the high position by forming an abutment with respect to a block 18 secured to the slide 12 and an inactive (retracted) position in which it does not oppose the movement of the block 18. A compression spring 17 biases the bolt 16 to its active position illustrated in FIG. 4.

A control element 34 in the shape of a square makes it possible to move the lock from its active position to its inactive position against the spring 17. The control element 34 is mounted so as to pivot on the support 10 and its rotation may be caused either by pulling on a cable 30 or by pulling on a strap 22, or by any other element, such as an electric motor or similar. The cable 30 is capable of sliding in a sheath 32 and is advantageously connected to the fascia panel of the vehicle, in order to allow the driver to control the retraction of the headrest 6 from his seat. The strap 22 has an end 22a placed at the top end of the seat 1 and an opposite end 22b connected to the control element 34. Thus, the retraction of the headrest 6 may be controlled from the top portion of the seat 1.

Figure 6:
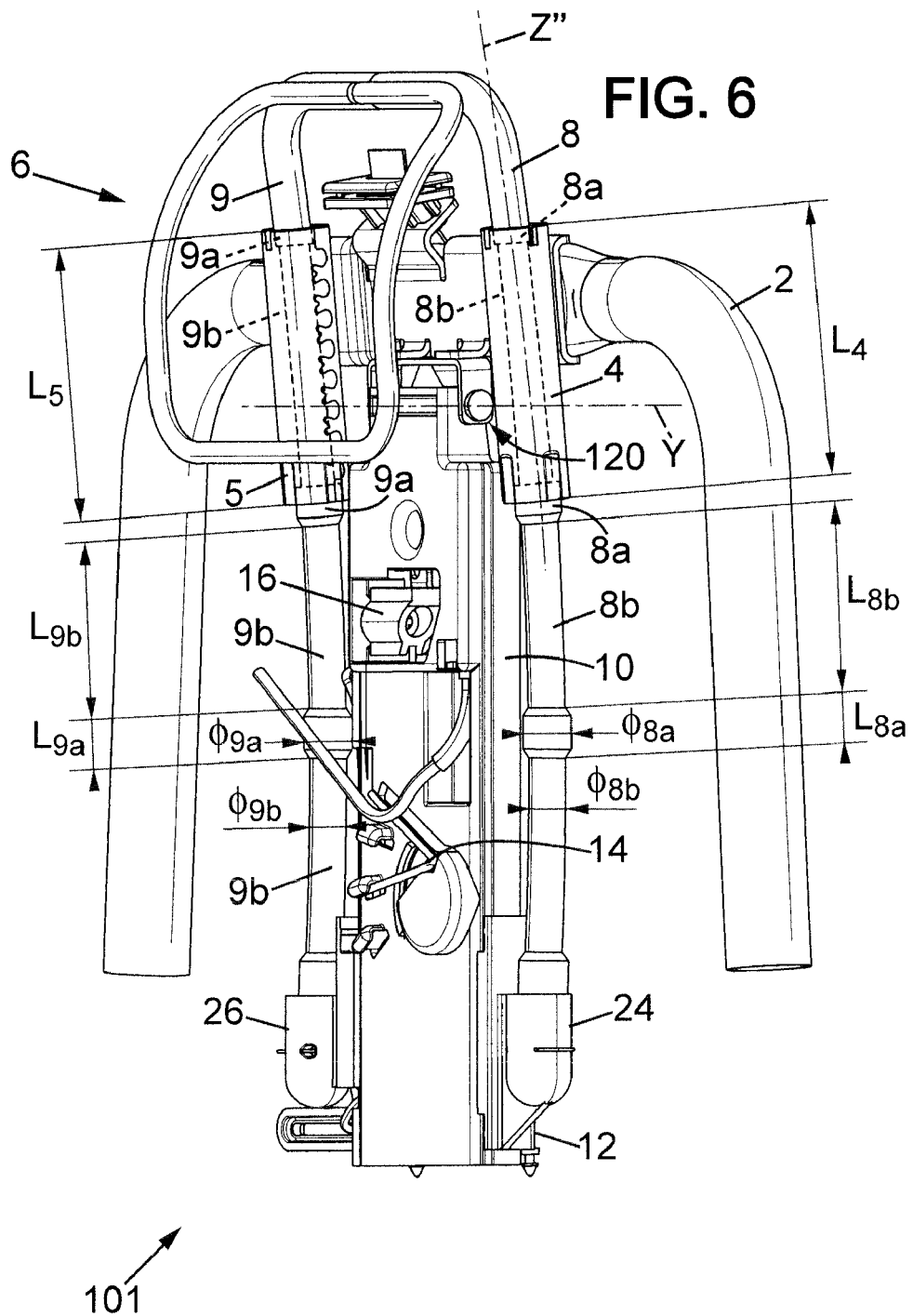
FIG. 6 represents, according to FIG. 5, a variant embodiment of a seat according to the invention.

FIG. 6 illustrates a variant embodiment in which the back 101 differs essentially from the back 1 illustrated in FIGS. 1 to 5 in that the swivel 20 is replaced by an articulation pivot 120 allowing the support to pivot relative to the structure 2 about a single axis, forming an axis of orientation and extending substantially parallel to the lateral and horizontal direction Y.

Furthermore, in the variant embodiment illustrated in FIG. 6, the stems 8 and 9 have intermediate zones 8b, 9b between bearing zones 8a, 9a. The diameter $\Phi_{8b}$, $\Phi_{9b}$ of the stems 8, 9 in the intermediate zones 8b, 9b is slightly smaller, preferably between one-tenth of a millimeter and 1 millimeter, than the diameter $\Phi_{8a}$, $\Phi_{9a}$, of the stems 8, 9 in the bearing zones 8a, 9a. The length $L_{8b}$, $L_{9b}$ of the intermediate zones 8b, 9b in the curvilinear direction Z" of the stems 8, 9 is less than the length $L_4$, $L_5$ of the sockets 4, 5 in the curvilinear direction Z".

Preferably, the length $L_{8b}$, $L_{9b}$ of the intermediate zones 8b, 9b in the curvilinear direction Z" is between 60° and 90% of the length $L_4$, $L_5$ of the sockets 4, 5 in the curvilinear direction Z". In addition, the length $L_{8a}$, $L_{9a}$ of the bearing zones 8a, 9a in the curvilinear direction Z" is between 3% and 20% of the length $L_4$, $L_5$ of the sockets 4, 5 in the curvilinear direction Z".

The invention claimed is:

1. A Motor vehicle seat back comprising:
a structure comprising at least one socket,
a headrest comprising at least one stem mounted so as to slide in said socket between a high position and a low position,
a support connected to the structure,
a slide connected to the stem and capable of sliding relative to the support in a direction of sliding,
a return element interposed between the slide and the support and biasing the headrest towards its low position,
a lock having an active state in which it is capable of holding the headrest in the high position and an inactive position in which it releases the headrest,
wherein the stem has a curve and the support is mounted on the structure through an articulation element having at least a degree of freedom to rotate about an axis of orientation.

2. The vehicle seat back according to claim 1, wherein the articulation element is a swivel allowing 3 degrees of freedom to rotate between the support and the structure.

3. The vehicle seat back according to claim 1, wherein the headrest comprises two stems to which the slide is secured.

4. The vehicle seat back according to claim 1, wherein the lock acts between the slide and the support.

5. The vehicle seat back according to claim 1, wherein the axis of orientation extends substantially horizontally and laterally.

6. The vehicle seat back according to claim 1, also comprising a strap having a first end placed on the upper portion of the back and a second end connected to the lock.

7. The vehicle seat back according to claim 1, also comprising a cup secured to the slide wherein the stem is received, said cup having a flared opening.

8. The vehicle seat back according to claim 1, wherein the stem comprises a succession of bearing zones separated from one another by intermediate zones having a cross section that is smaller than the cross section of the bearing zones.

9. The vehicle seat back according to claim 8, wherein the bearing zones are separated from one another by a length of between 60% and 90% of the length of the socket.

10. The vehicle seat back according to claim 8, wherein the bearing zones have a length of between 3% and 20% of the length of the socket.

* * * * *